(12) United States Patent
Orlamünder et al.

(10) Patent No.: US 9,429,211 B2
(45) Date of Patent: Aug. 30, 2016

(54) DRIVE SYSTEM FOR A VEHICLE

(75) Inventors: Andreas Orlamünder, Schonungen (DE); Daniel Lorenz, Bad Kissingen (DE); Michael Kühner, Heilbronn (DE); Thomas Dögel, Nüdlingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 312 days.

(21) Appl. No.: 14/124,182

(22) PCT Filed: May 9, 2012

(86) PCT No.: PCT/EP2012/058561
§ 371 (c)(1),
(2), (4) Date: Jan. 23, 2014

(87) PCT Pub. No.: WO2012/168026
PCT Pub. Date: Dec. 13, 2012

(65) Prior Publication Data
US 2015/0362042 A1   Dec. 17, 2015

(30) Foreign Application Priority Data

Jun. 7, 2011 (DE) .......................... 10 2011 077 121
Apr. 10, 2012 (DE) .......................... 10 2012 205 793

(51) Int. Cl.
*F16F 15/14* (2006.01)
*F16F 15/123* (2006.01)

(52) U.S. Cl.
CPC ........... *F16F 15/145* (2013.01); *F16F 15/123* (2013.01); *F16F 15/1421* (2013.01); *Y10T 74/2128* (2015.01)

(58) Field of Classification Search
CPC .... F16F 15/145; F16F 15/123; F16F 15/133; F16F 15/1333; F16F 15/30; F16D 3/12; F16D 3/52; Y10T 74/2121; Y10T 74/2128
USPC ............... 123/192.1, 192.2; 74/572.2, 574.2
See application file for complete search history.

(56) References Cited

U.S. PATENT DOCUMENTS

| 5,863,274 A | * | 1/1999 | Jackel | ............... F16F 15/13157 192/70.17 |
| 6,408,717 B1 | | 6/2002 | Young et al. | |
| 2003/0109357 A1 | * | 6/2003 | Tabata | ..................... B60K 6/32 477/109 |

(Continued)

FOREIGN PATENT DOCUMENTS

| DE | 100 18 955 A1 | 10/2001 |
| DE | 10 2006 008541 A1 | 8/2006 |
| DE | 10 2009 042812 A1 | 5/2010 |

*Primary Examiner* — Grant Moubry
(74) *Attorney, Agent, or Firm* — Cozen O'Connor

(57) ABSTRACT

A drive system for a vehicle comprises an internal combustion engine and a torsional vibration damping arrangement. The internal combustion engine is switchable between operating modes of different performance capability, and the torsional vibration damping arrangement comprises a flywheel mass arrangement and at least one deflection mass pendulum unit with a deflection mass carrier and a deflection mass arrangement supported at the deflection mass carrier such that it can deflect out of a basic relative position with respect to the latter by means of a deflection mass coupling arrangement.

12 Claims, 9 Drawing Sheets

(56) References Cited

U.S. PATENT DOCUMENTS

| | | |
|---|---|---|
| 2005/0205060 A1 | 9/2005 | Michelini et al. |
| 2007/0037659 A1* | 2/2007 | Bailey .................... F16D 25/10 475/296 |
| 2010/0236228 A1* | 9/2010 | Degler .................. F16F 15/145 60/338 |
| 2010/0300414 A1* | 12/2010 | Pursifull ................. F01N 11/00 123/559.1 |

* cited by examiner

Fig. 1
Prior Art
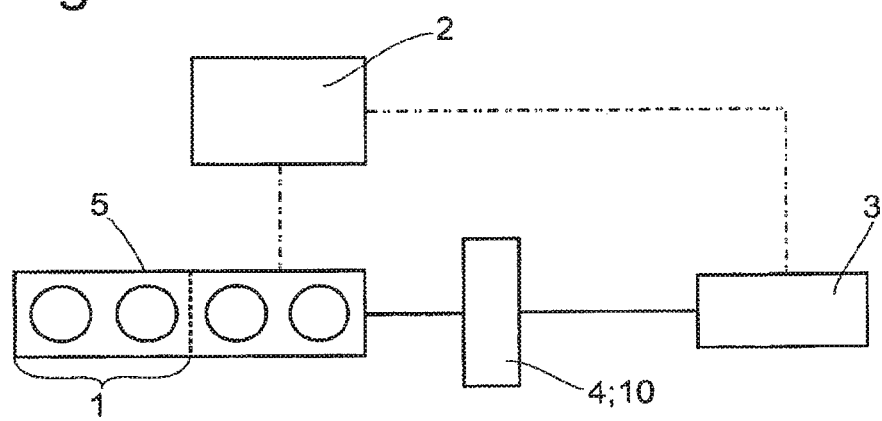
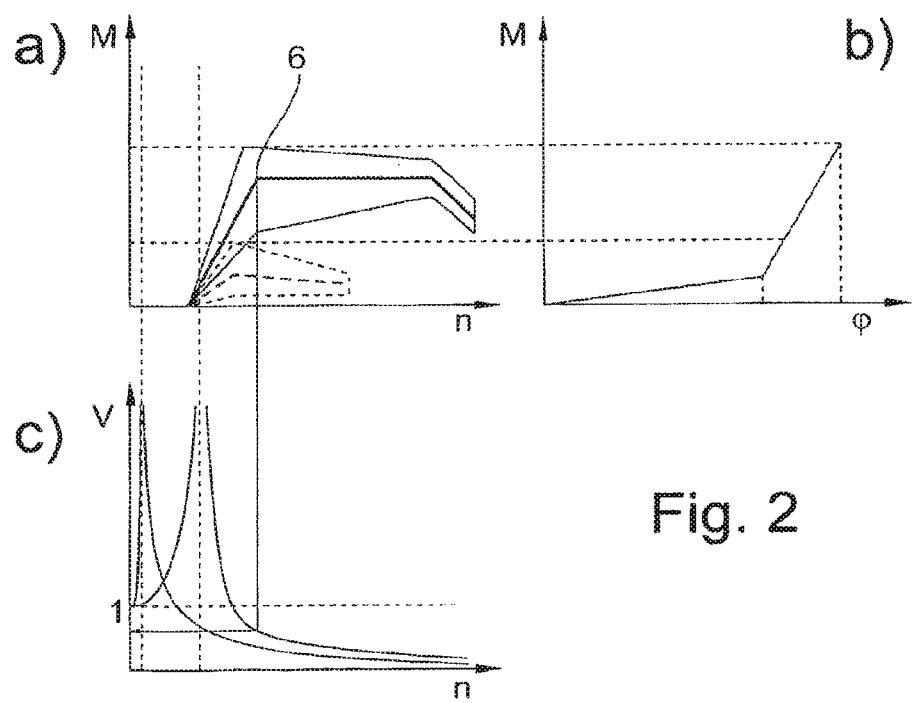
Fig. 2

DRIVE SYSTEM FOR A VEHICLE

CROSS-REFERENCE TO RELATED APPLICATIONS

This is a U.S. national stage of application No. PCT/EP2012/058561, filed on 9 May 2012, which claims priority to the German Application Nos. 10 2011 077 121.2, filed 7 Jun. 2011 and 10 2012 205 793.5, filed 10 Apr. 2012, the content of all three incorporated herein by reference.

BACKGROUND OF THE INVENTION

1. Field of the Invention

The present invention is directed to a drive system for a vehicle comprising an internal combustion engine and a torsional vibration damping arrangement wherein the internal combustion engine is switchable between operating modes of different performance capability.

2. Related Art

A drive system, shown schematically in FIG. 1, comprises an internal combustion engine 5 which delivers an unsteady torque owing to the periodic combustion process. Accordingly, a disturbance torque with fixed orders is superposed on the nominal torque. These orders depend on the combustion process (two-cycle or four-cycle process) and on the number of cylinders. Thus the main exciting order of a four-cylinder four-cycle engine is the second order, that of a three-cylinder four-cycle engine is the 1.5th order, and that of a four-cylinder two-cycle engine is the second order.

The system has a control device 2, which detects the load condition and rotational speed at the engine based on signals, e.g., vehicle speed, from the engine or from the rest of the drivetrain 3 (gearbox, differential, axle), whereupon it chooses whether all of the cylinders or only some of the cylinders are to be operated or which combustion process is to be used in the engine; that is, generally speaking, it chooses between operating modes of different performance capability.

In order to stabilize the drivetrain, vibration reducing systems 4, which are configured, e.g., based on the excitation order are used as torsional vibration damping arrangements. For this purpose, it was possible heretofore to proceed from fixed orders which were not variable during operation.

For the purpose of reducing consumption and therefore also emissions, it is possible to change the quantity of cylinders or the combustion process, i.e., the operating mode, during operation. An internal combustion engine always has its optimal efficiency at a relatively high load so that the specific fuel consumption is lowest at that time. The common partial load states in real operation consume too much fuel in relation to the demanded power.

One solution to this problem is to switch off individual cylinders 1 and operate the rest of the cylinders at a higher load level and, therefore, at a higher level of efficiency. This switching off can be carried out, for example, by turning off the fuel injection for half of the cylinders and/or changing the control times via a variable valve control.

As an alternative solution to switching off cylinders, a four-cycle engine can be optimally configured for partial load operation and can be switched to two-cycle operation at peak load when needed.

Particularly in the cycle relevant for consumption, only loads which are very small in relation to the full engine are demanded; thus in the NEDC (New European Driving Cycle) the engine with an installed power of up to 200 kW only puts out approximately 10 kW because the required accelerations are very moderate. Also, for routine operation of a vehicle the full load is requested only in rare cases so that switching off cylinders or switching operating modes offers a great savings potential.

When the excitation order changes, the distance with respect to rotational speed or frequency between the operating range and the natural frequency of the vibration reducing system also changes and, therefore, so does the quality of vibration reduction.

SUMMARY OF THE INVENTION

It is the object of the present invention to design a drive system in such a way that a good vibration reduction quality is constantly ensured with varying excitation behavior during operation.

This object is met according to the invention by a drive system as described below.

BRIEF DESCRIPTION OF DRAWINGS

The invention will be described in more detail in the following with reference to the accompanying drawings. In the drawings:

FIG. 1 is a schematic depiction of a drive system;

FIG. 2 consist of Views 2a), 2b) and 2c) in which View 2a) is a diagram of the torque that can be delivered by the internal combustion engine in an operating mode with maximum performance capability and an operating mode with reduced performance capability, plotted over the rotational speed;

Figure 3:
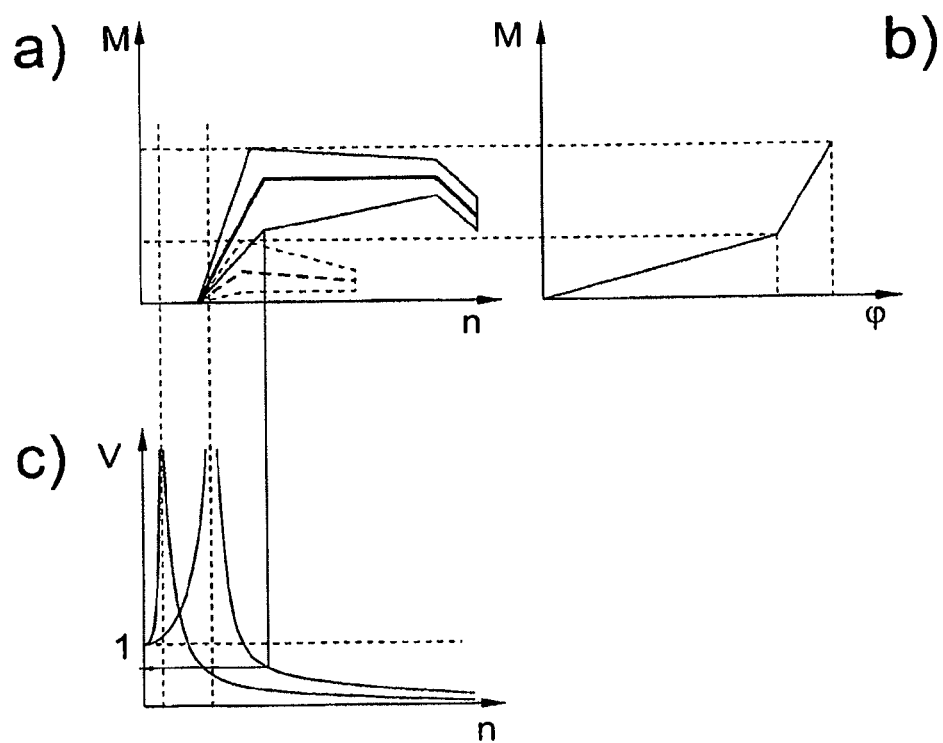
Figure 4:
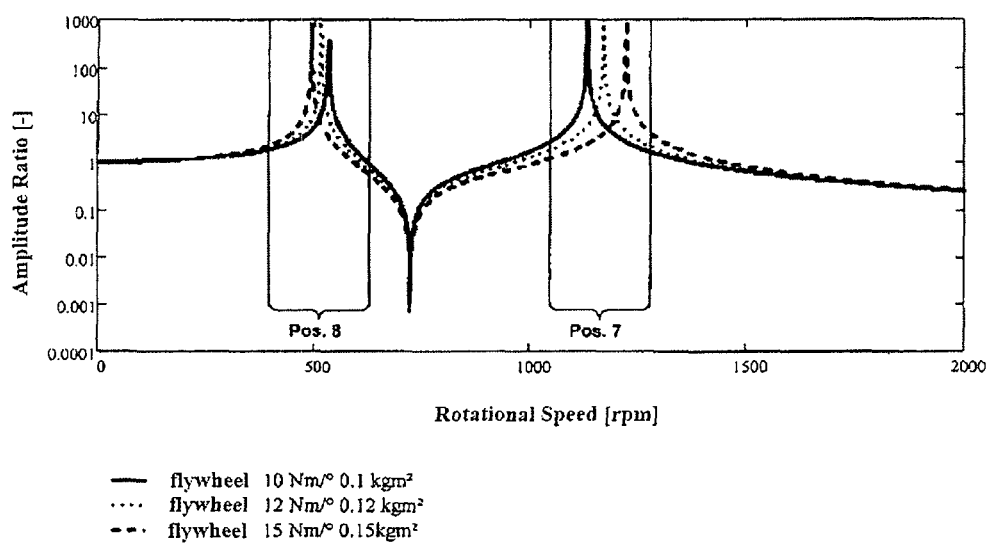
Figure 5:
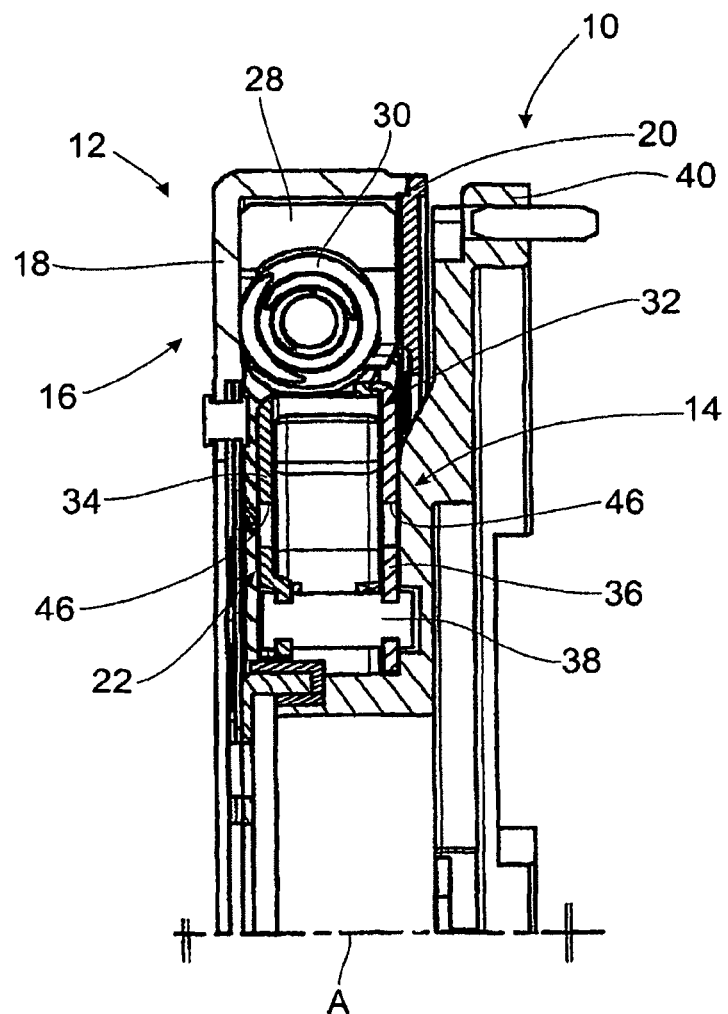
Figure 6:
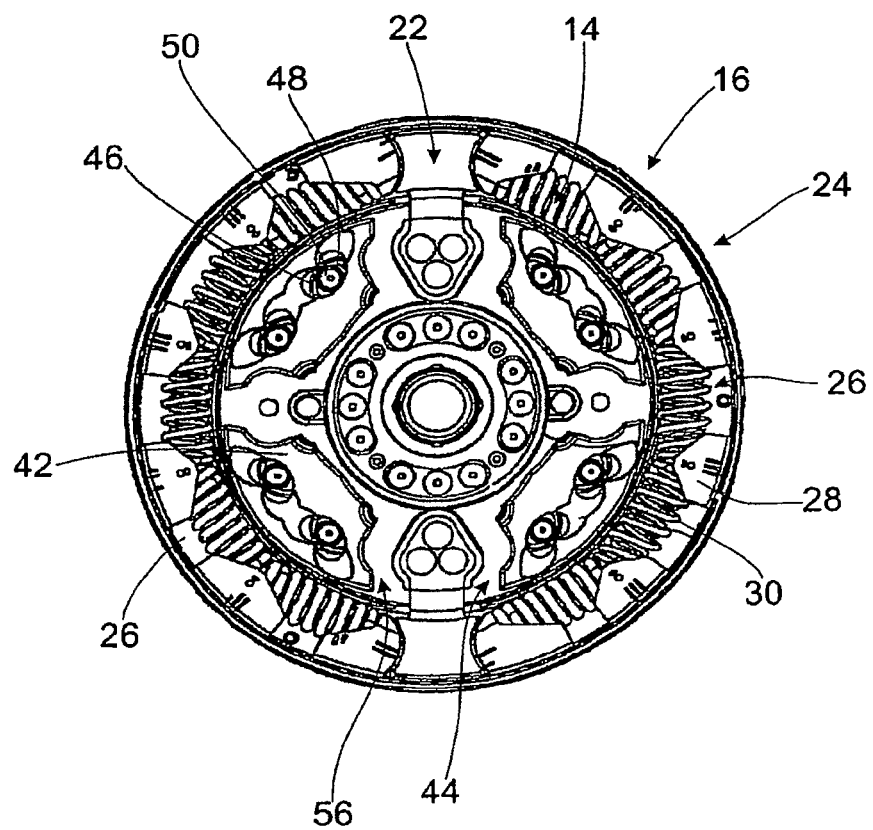
Figure 7:
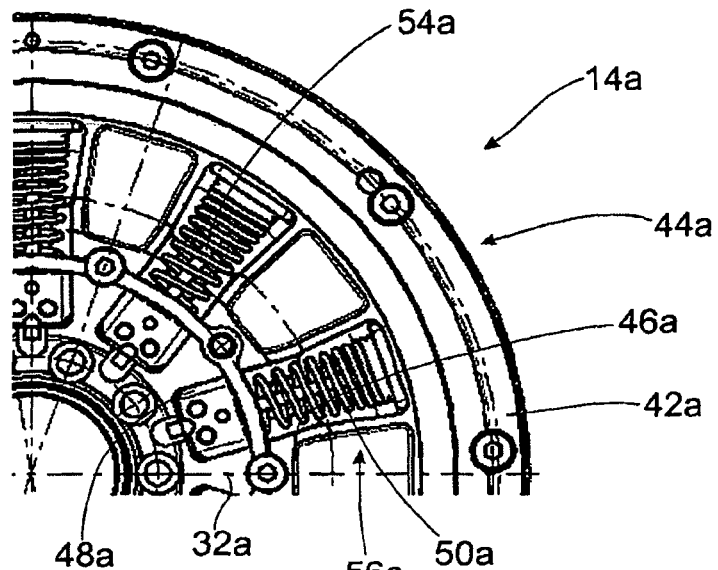
Figure 8:
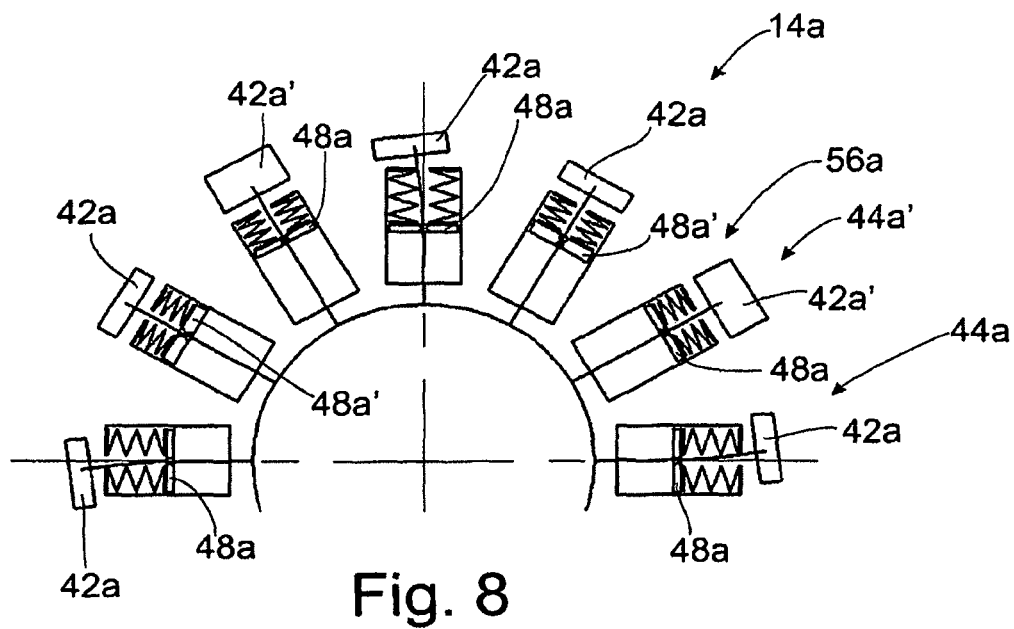
Figure 9:
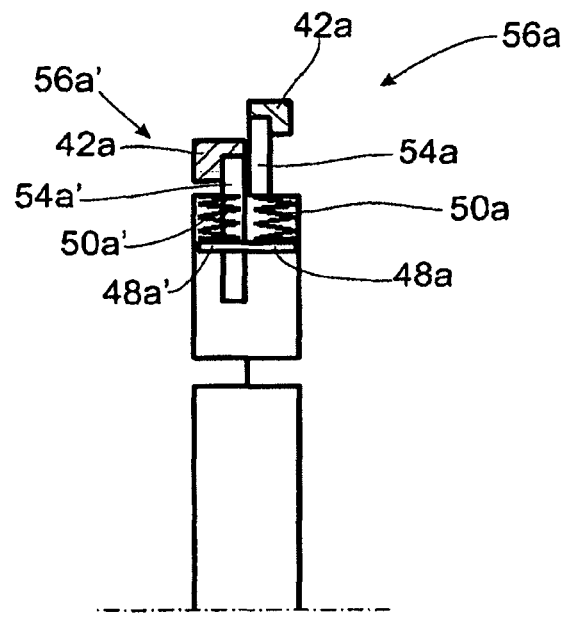
Figure 10:
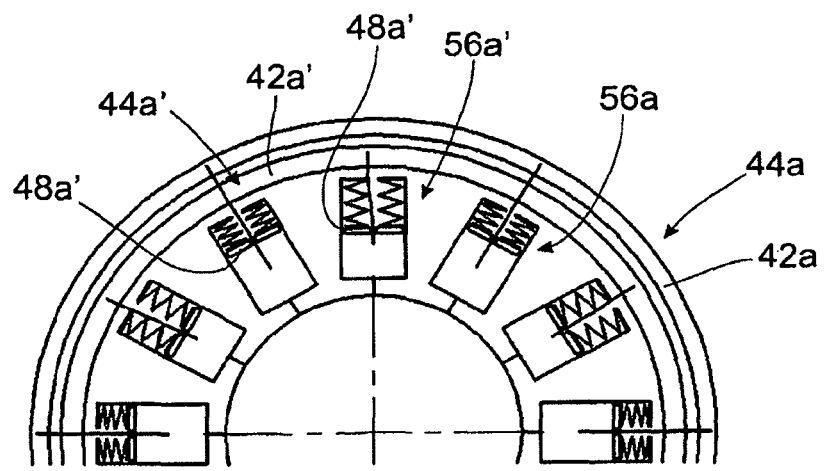
Figure 11:
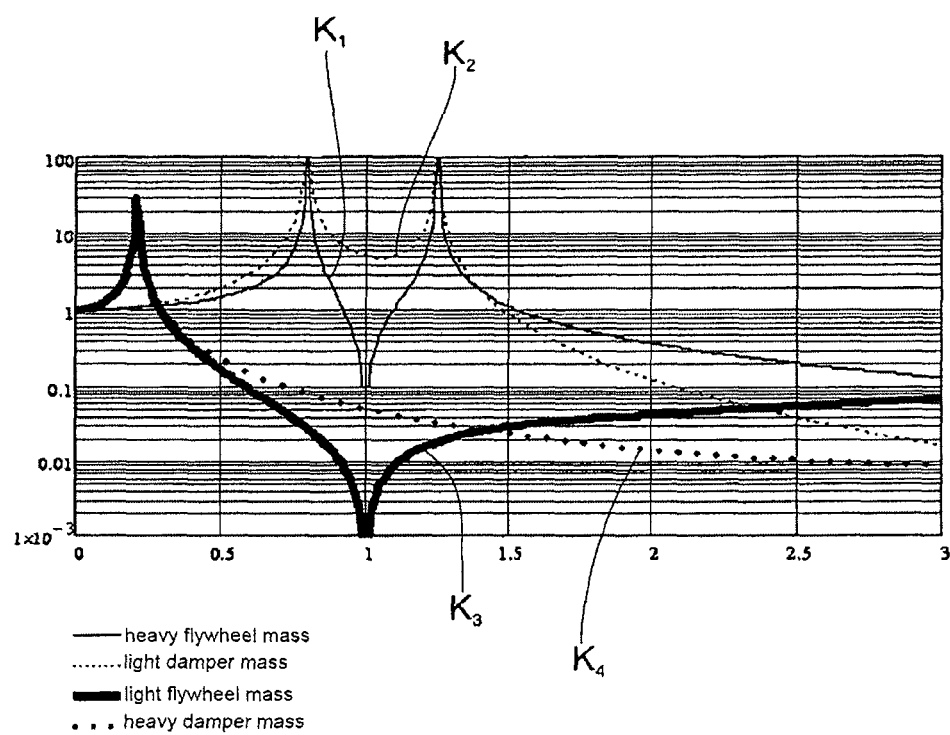
Figure 12:
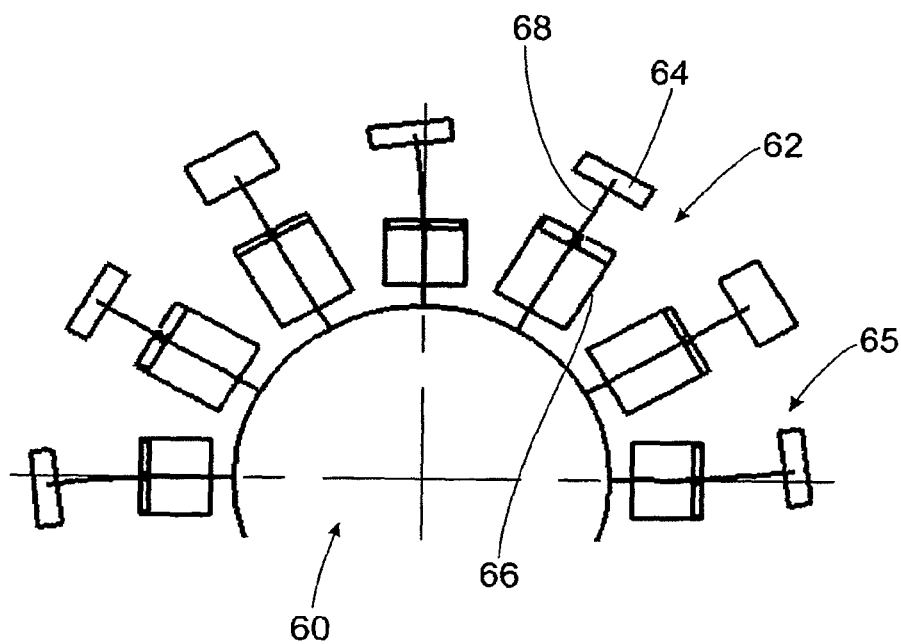

View 2b) is a diagram of an angle-torque characteristic of a torsional vibration damping arrangement with unfavorably configured characteristic;

View 2c) is a diagram of the transfer function of the torsional vibration damping arrangement with the resonances of two damper stages, plotted over the rotational speed;

FIG. 3 consist of Views 3a), 3b) and 3c) in which View 3a) is a view corresponding to View 2a);

View 3b) is a diagram of a characteristic of a torsional vibration damping arrangement corresponding to View 2b) but with favorably configured characteristic;

View 3c) is a graph corresponding to View 2c) showing the transfer functions for a favorably configured characteristic;

FIG. 4 is a diagram showing the transfer function of a speed-adaptive damper, plotted over rotational speed;

FIG. 5 is a partial longitudinal sectional view of a torsional vibration damping arrangement with a torsional vibration damper and a speed-adaptive damper;

FIG. 6. is the torsional vibration damping arrangement of FIG. 5 in an axial view and in the open state;

FIG. 7 is a partial axial view of a speed-adaptive damper constructed in a different manner;

FIG. 8 is a schematic partial axial view of a speed-adaptive damper based on the principle of construction illustrated in FIG. 7;

FIG. 9 is a longitudinal sectional view of a speed-adaptive damper based on the principle of construction illustrated in FIG. 7;

FIG. 10 shows the speed-adaptive damper of FIG. 9 in a partial axial view;

FIG. 11 is a diagram corresponding to FIG. 4 of a transfer function of a speed-adaptive damper for different configurations;

FIG. 12 is a schematic partial axial view of a fixed-frequency damper.

DETAILED DESCRIPTION OF THE PRESENTLY PREFERRED EMBODIMENTS

A lowpass filter passes the torque having a low frequency or order (e.g., ideally only the nominal torque of zeroeth order) and blocks the alternating higher-order or higher-frequency torques. This is realized by a vibratory dual mass flywheel (DMF) with a primary side and a secondary side which is rotatable with respect to the primary side against the action of a damper element arrangement, e.g., spring arrangement, and which has a natural frequency at which the system can execute very high angular deflections when this natural frequency is excited. At best, this leads to annoying noise, and at worst the system will be destroyed. Therefore, the systems are so designed with respect to their mass-stiffness ratios that this natural frequency lies far below the idling speed and, therefore, the operating rotational speed range. For example, the natural frequency of a dual mass flywheel is approximately 750/min.

When this dual mass flywheel is operated in a four-cylinder four-cycle engine, the lowest excitation frequency, at an idling speed of 750/min through the second order as main exciting order, is at approximately 1600/min, i.e., far above the resonance of the dual mass flywheel. This makes use of the fact that far above the resonance the amplitudes are smaller downstream of the system than upstream of the system because of the transfer function. The dual mass flywheel decouples and reduces the excitation which is conveyed to the rest of the drivetrain, e.g., the gearbox, and which can lead to noise.

If the quantity of cylinders in this engine is halved, the main exciting order is also halved from the second order to the first order. Accordingly, the lowest excitation frequency at an idling speed of 750/min is at 800/min and, therefore, in the range of the resonant frequency of the dual mass flywheel. The amplitudes are very high and the system does not decouple.

While the solution of increasing the idling speed in switch-off operation is reasonable with respect to engine dynamics, it has the disadvantage that the speed-proportional hydrodynamic losses increase and the engine is no longer operated in the range of optimum efficiency. For this reason, the vibration reducing system must be specially tuned.

FIG. 2 shows how a conventional design of a torsional vibration damping arrangement, e.g., dual mass flywheel, affects the behavior when cylinders are switched off. View 2b) shows a progressive torque-angle characteristic having a kink where the stiffness increases sharply. The first stage is an idling stage or low load stage, for example. The characteristic is substantially linear in the two characteristic curve segments below and above the kink.

In View 2a), the solid bold line represents the nominal torque of a four-cylinder engine over rotational speed. The enveloping solid thin lines show the amplitudes of the superposed alternating torque and accordingly represent the maximum and minimum torque, respectively. Comparison with the characteristic of the dual mass flywheel shows that the second stage of the dual mass flywheel is active at full load. The solid bold line shows the nominal torque with no cylinders switched off, i.e., in an operating mode with higher or maximum performance capability.

The bold dashed line in View 2a) shows the nominal torque curve of the engine with switched off cylinders in which only two cylinders are operating. Consequently, also only approximately half of the torque is available. A disturbance torque, whose amplitude is shown by the thin dashed enveloping line, is likewise superposed on this nominal torque. Usually, switch-off operation is not applied over the entire rotational speed band of the engine.

However, as a result of the configuration of the characteristic the soft first stage is not sufficient for the nominal torque in switched-off cylinder operation, so that the dual mass flywheel is operated in its second stage.

The decoupling quality depends in both cases—all-cylinder operation and switch-off operation—on the speed-related distance from the resonance of the dual mass flywheel.

In all-cylinder operation, the dual mass flywheel is still operated supercritically due to the main excitation order (second order). In the transfer function shown in View 2c) it can be seen that the amplitude ratio is less than 1 considering, for example, the rotational speed at position 6 in that the vertical line is dropped at the rotational speed until hitting the transfer function of the second stage.

If cylinders are switched off in the engine, the main exciting order decreases, for example, by half Instead of the second order, the first order is relevant. Therefore, an adaptation of order must be carried out in View 2c); accordingly, at half of the rotational speed, the transfer function of the second stage of the dual mass flywheel is reached close to resonance—even subcritically in this case—at a substantially greater amplitude ratio, which results in an unacceptably poor decoupling quality in spite of the lower torque amplitude in switched-off cylinder operation.

The reason for the poor response is the very flat first stage so that operation takes place in the excessively stiff second stage in switched-off cylinder operation.

One solution consists in making the first stage of the characteristic so stiff that, on the one hand, switched-off cylinder operation always takes place in the first stage and, on the other hand, the stiffness is still small enough that supercritical operation is possible.

It is clear from View 3b) that the stiffness was maintained in the second stage, which ensures a good decoupling at full load in all-cylinder operation, while the second stage was adapted to be stiffer than in FIG. 2 so that switch-off operation can always take place in this first stage.

In this way, a transfer function of <1 and, therefore, a decoupling of vibrations is achieved even after adapting the order for switch-off operation.

A deflection mass oscillating unit, referred to generally as a mass damper, comprises a mass as dynamic energy accumulator and a stiffness as static energy accumulator. Its natural frequency is tuned such that, when excited, the structural component to which the mass damper is connected does not undergo deflection.

The stiffness may be constant, resulting in a fixed-frequency damper, or may be speed-dependent resulting in an order damper, also known as a speed-adaptive damper. A fixed-frequency damper only damps a fixed frequency, while the order damper damps an order.

Order dampers in the form of centrifugal pendulums which are designed to absorb the main exciting orders are particularly common in motor vehicles. It was mentioned above that the main exciting order changes when switching off cylinders or switching combustion processes or, generally speaking, when the operating mode changes. In view of this fact, an individual mass damper cannot stabilize the drivetrain. There is even a risk that because of its two natural frequencies the mass damper will exacerbate resonances if an "incorrect" excitation order is applied.

One solution consists in installing a specifically tuned mass damper for every possible order.

For this purpose, individual mass dampers must be installed for all orders that occur or for all critical orders. In case of the four-cylinder engine which is reduced to a two-cylinder engine, a mass damper tuned to the second order and the first order would be required.

As is shown in FIG. 4, a mass damper has, besides its mass damper frequency, two natural frequencies in which its amplitude can be very large. The distance between these natural frequencies and the damper frequency with respect to rotational speed depends on the ratio of mass to mass moment of inertia. The greater the inertia of the mass damper, the greater the distance. Naturally, it must be taken into consideration in this regard that the stiffness must be adapted to the mass or to the mass moment of inertia in order to maintain the damper frequency or damper order. The ratio of stiffness to mass must remain equal.

An order damper, e.g., a centrifugal pendulum (speed-adaptive damper), exhibits the same behavior when the order rather than the frequency is plotted on the abscissa.

As regards switching off cylinders, this means that when the excitation order is halved exactly one of the lower resonances or resonant orders of the mass damper can be affected, which can lead to the destruction of the mass damper or to excitation of vibrations by the mass damper.

The solution consists in that the inertia of the damper mass is either less than, e.g., 90%, preferably 75%, at most preferably 50%, of the flywheel, generally a flywheel mass arrangement, in order to remain appreciably below the lower damper resonance when reducing the order, or appreciably greater than 110%, preferably 150%, at most preferably 200%, in order to remain operating above the damper resonance in switching operation.

Often, the value of 200% is difficult to adjust for reasons relating to installation space and weight, while the value of 50% is limited by the energy accumulator capability of the mass damper; in particular, a speed-adaptive damper requires a sufficiently large mass because it derives its stiffness from the centrifugal force.

The behavior shown in FIG. 4 applies to any mass damper that is used with its specific damper frequency or damper order in the vibration reducing system.

Further, the set of problems described above also applies to the opposite case. For example, if a mass damper tuned to the second order and a mass damper tuned to the first order are used in a four-cylinder engine, the mass damper of the first order which is to work for switch-off operation (two-cylinder operation) runs the risk that its upper resonant frequency or resonant order in four-cylinder operation is affected precisely by the main exciting order. Accordingly, a sufficiently large frequency distance or order distance must also be ensured in this case by a suitable mass or mass moment of inertia (e.g., <50% or >>200%). Accordingly, it must be ensured when configuring the orders or frequencies for the mass damper for all-cylinder operation and switch-off operation that the frequency ranges or order ranges at position 7 and at position 8 of all of the mass dampers are not affected.

With respect to the mass damper, it is possible in particular to carry out a good preliminary decoupling beforehand by means of a lowpass filter, e.g., a dual mass flywheel, so that the remaining residual alternating torque, which has a very small amplitude, is compensated by the mass damper. Accordingly, mass dampers having a small mass and, there-fore, a limited ability to absorb energy, are also capable of ensuring sufficient comfort in both operating states.

FIGS. 5 and 6 show an exemplary embodiment of a torsional vibration damping arrangement, designated generally by 10, in which a torsional vibration damper 12 constructed in the manner of a dual mass flywheel is combined with a speed-adaptive damper 14. The torsional vibration damper 12 comprises a primary side 16 with two cover disk elements 18, 20 and a secondary side, designated generally by 22, on which the speed-adaptive damper 14 is also provided. The primary side 16 and secondary side 22 provide respective circumferential supporting regions for a damper element arrangement 24 which comprises two damper spring units 26, 26' in the depicted embodiment example. Each damper spring unit 26, 26' comprises a plurality of damper springs 30 consecutively in circumferential direction, which are supported at one another and with respect to the primary side 16 and secondary side 22 via a slide shoe and spring seat 28, respectively. Damper springs 30 arranged consecutively in circumferential direction can be formed differently with respect to one another, i.e., can provide different stiffnesses, so that a stepped characteristic curve is obtained. Springs 30 can also be arranged so as to be nested one inside the other in order to further influence stiffness.

The secondary side 22 provides a deflection mass carrier 32 of the speed-adaptive damper 14 acting as deflection mass pendulum arrangement, this deflection mass carrier 32 being formed on the housing side in this instance. For this purpose, housing parts 34, 36 which are shell-shaped, for example, are connected to one another at their radially inner region by rivets 38. Also, a flywheel 40 on the secondary side is fixedly connected to the deflection mass carrier 32, for example, by rivets.

Provided at the deflection mass carrier 32 in the embodiment example shown in FIG. 6 is a total of four deflection masses 42 which are arranged at an angular distance of 90° from one another and which in their entirety form a deflection mass arrangement 44. Guide paths 46, 48 are provided in the deflection mass carrier 32 and the deflection masses 42 and are associated with one another, respectively. The guide paths 46 provided at the deflection mass carrier 32 have a vertex region on the radially outer side, while the guide paths 48 provided at the deflection masses 42 have a vertex region located on the radially inner side. The guide paths 46, 48 are curved radially inward and radially outward, respectively, starting from the respective vertex regions. Associated with these guide paths 48 are pin-shaped or roller-shaped coupling elements 50 which are movable along guide paths 46 in the deflection mass carrier 32 and along guide paths 48 in the deflection masses 42. Owing to the curvature and positioning of the vertex regions, the coupling elements 50 position themselves in the respective vertex regions when the torsional vibration damping arrangement 10 rotates around an axis of rotation A such that the deflection masses 42 always occupy a position at the greatest possible radial distance from the axis of rotation A.

In the event of rotational irregularities or torsional vibrations, the coupling elements 50 move along the guide paths 46, 48 proceeding from the vertex regions so that the deflection masses 42 are forced in centrifugal potential radially inward and accordingly absorb potential energy. The deflection masses 42 are accordingly set in oscillation and, by reason of the curvature of the guide paths and the masses and mass moments of inertia of the deflection masses 42, the speed-adaptive damper 14 inherently has a natural frequency which varies with varying rotational speed and varying centrifugal force. This means that as a result of the interaction between the coupling elements 50 and the curved guide paths 46, 48 a pseudo stiffness is provided in the connection of the deflection masses 42, which changes as a function of the rotational speed. In this regard, it is possible to find a configuration or a tuning to a predetermined order so that the natural frequency of the vibration system provided with the totality of deflection masses or provided by the deflection mass arrangement 44 also changes along with the order which shifts depending on rotational speed. Accordingly, the deflection mass carrier 32, together with the deflection masses 42 at the latter which can deflect out of the basic relative position, or with the deflection mass arrangement 44, forms a deflection mass pendulum unit which is designated generally by 56. In the torsional vibration damping arrangement comprising this deflection mass pendulum unit 56, i.e., essentially comprising the speed-adaptive damper 14 and the torsional vibration damper 12, which acts like a dual mass flywheel, the primary side 16 of the torsional vibration damper 12 essentially provides the flywheel mass arrangement coupled to the deflection mass pendulum unit 56 via the stiffness provided by the damper element arrangement 24 or damper spring units 26 thereof In order to take into account the fact that the critical excitation orders also change when switching the internal combustion engine 5 between different operating modes, i.e., for example, when changing from four-cylinder operation to two-cylinder operation, specifically tuned mass dampers can be provided, for example, in a drive system so as to be associated with a plurality of critical orders which can occur in, or which may become critical in, various operating modes. Also, the deflection masses 42 and/or the guide paths 46, 48 could be configured differently in one and the same mass damper so that it is possible to tune to different excitation orders in one and the same mass damper, in which case the deflection masses associated with a respective excitation order in themselves provide a specifically tuned deflection mass arrangement.

Another constructional principle for a speed-adaptive damper is shown in FIG. 7. This mass damper 14a, which also acts as a deflection mass pendulum unit 56a, has a deflection mass carrier 32a, which is again provided, for example, on the secondary side at a torsional vibration damper, e.g., a dual mass flywheel. Supporting elements 48a are radially movably guided at this deflection mass carrier 32a in radially extending guide openings 46a and are acted upon radially inwardly in direction of a basic position by pre-loading springs 50a, which are radially outwardly supported at the deflection mass carrier 32a and formed in this instance as coil compression springs. An annular deflection mass 42a radially outwardly surrounding the deflection mass carrier 32a substantially provides a deflection mass arrangement 44a from which a restoring element 54a formed, for example, as a leaf spring extends radially inwardly through the respective pre-loading spring 50a so as to be associated with the supporting element 48a. The restoring elements 50a are fixed by their radially outer region to the deflection mass 42a in a deflection mass supporting region in each instance. They are supported in their radially inner region in circumferential direction at the respective associated supporting elements 48a in a carrier support region.

A supporting element 48a, together with the pre-loading spring 50a associated with it and a respective restoring element 54a, forms a deflection mass pendulum unit 56a, and a common deflection mass 42a or deflection mass arrangement 44a is associated with all of the deflection mass pendulum units 56a in the embodiment example shown in FIG. 7.

In rotational operation, rotational irregularities cause the deflection mass arrangement 44a to undergo a circumferential acceleration with respect to the deflection mass carrier 32a. The deflection mass arrangement 44a is supported via the restoring elements 54a formed, for example, as leaf springs at the supporting elements 48a and, via the latter, at the deflection mass carrier 32a. Owing to the spring characteristics of the restoring elements 54a, the deflection mass arrangement 44a is basically pre-loaded in a basic relative position with respect to the deflection mass carrier 44a. Accordingly, a vibration system is formed that has a natural frequency depending on the mass inertia or mass moment of inertia of the deflection mass arrangement 44a and the stiffness produced by the totality of restoring elements 54a.

In rotational operation, the supporting elements 48a are subject to the action of centrifugal force so that they are basically acted upon radially outwardly against the restoring force of the pre-loading springs 50a. When the pre-loading springs 50a are kept pre-loaded, for example, when supporting elements 48a are positioned in the basic position, a determined minimum rotational speed is required to overcome this pre-loading action by the corresponding centrifugal force. If this minimum rotational speed is exceeded, the centrifugal force is sufficient to shift the supporting elements 48a radially outward against the restoring action of the pre-loading springs 50a. However, in so doing the region at which the restoring elements 54a can be supported with respect to the deflection mass carrier 32a also shifts radially outward. This in turn has the result that the free length of the restoring elements 54a decreases as the rotational speed increases so that the stiffness and therefore also the natural frequency of the aforementioned vibration system increases. This type of shifting of the natural frequency can persist up to an upper limiting rotational speed at which it is impossible for the supporting elements 48a to shift any farther radially outward, for example, because the pre-loading springs 50a are fully compressed or because stops take effect. In the rotational speed range in which a centrifugal force-dependent radial shifting of the supporting elements 48a is possible, the mass damper 14a actually acts as a speed-adaptive damper which can be tuned to an excitation order. If the rotational speed is too low or too high, i.e., if the supporting elements 48a are essentially held so as to be immovable radially, a rotational speed adaptation of the natural frequency does not take place, so that the vibration system acts as a fixed-frequency damper under these conditions.

Tuning to a plurality of orders is also possible in the construction shown in FIG. 7, for example, in that a plurality of mass dampers of this kind provided with respective carriers, deflection mass arrangements or deflection mass pendulum units are tuned to different excitation orders.

FIG. 8 illustrates an example in which it is possible to tune to a plurality of excitation orders in a speed-adaptive damper 14a or within a range of rotational speeds of speed-adaptive damper 14a. FIG. 8 shows differently configured deflection mass pendulum units 56a. They differ from one another, for example, with respect to the deflection mass 42a and 42a', respectively, in that deflection mass 42a' has a larger mass than deflection mass 42a. The deflection mass pendulum units 56a also differ from one another with respect to the configuration of the supporting elements 48a and 48a', respectively, in that supporting elements 48a' have a larger mass than supporting elements 48a. Through the selection of mass ratios, influence can be exerted on the rotational speed and, therefore, on the centrifugal force-dependent change in the radial position of the supporting elements and, therefore, on the stiffness of the restoring elements as well as on the mass moment of inertia of the deflection mass arrangements 44a and 44a' provided by the totality of respective deflection masses 42a and 42a'. Thus a portion of the deflection mass pendulum units 56a can be formed for tuning to a predetermined order, and the totality of deflection masses of these deflection mass pendulum units 56a can then provide a deflection mass arrangement to be taken into consideration for this order. Another portion of the deflection mass pendulum units 56a can be tuned for a different exciting order.

An example for tuning to different exciting orders is shown in FIGS. 9 and 10. A plurality of deflection mass pendulum units 56a and 56a', respectively, are provided in this embodiment example, wherein the deflection mass units 56a have a common annular deflection mass 42a and, therefore, deflection mass arrangement 44a, while deflection mass pendulum units 56a also have a common annular deflection mass 42a' and, therefore, deflection mass arrangement 44a'. It is possible to tune the two groups of deflection mass pendulum units 56a and 56a' to respective excitation orders, for example, by different configuration, i.e., dimensioning, of annular deflection masses 42a, 42a', by different configuration or dimensioning of supporting elements 48a and 48a', by different configuration of the restoring elements 54a and 54a' and by different configuration of pre-loading springs 50a and 50a'.

In the embodiment forms described above in which a torsional vibration damping arrangement 10 comprises a deflection mass pendulum arrangement, i.e., for example, a speed-adaptive damper 14, combined with a torsional vibration damper 12, the primary side 16 or primary-side mass can basically be regarded as a flywheel mass arrangement which is coupled via a stiffness, namely, the damper element arrangement 24, to the deflection mass pendulum unit(s), particularly the deflection mass carrier 32a. The latter is coupled in turn to the deflection mass arrangement(s) 44, 44a via a stiffness provided by coupling elements 50 or restoring elements 54a.

The transfer function of a drive system of this kind and of the vibration systems contained therein is shown once again in FIG. 11 in a manner corresponding to FIG. 4. The transfer function shows the ratio between an output-side vibration quantity, i.e., for example, rotational acceleration, rotational angular velocity or the like, and a corresponding input-side vibration quantity. A value of zero or near zero represents an ideal decoupling in which there are practically no vibrations on the output side.

In FIG. 11, curve $K_1$ represents the transfer function of the flywheel mass arrangement, e.g., as primary side 16, plotted over the ratio of the excitation quantity to the resonance of the vibration system. The damper frequency of the flywheel mass arrangement at which there are essentially no vibrations on the output side, i.e., after the stiffness provided by damper element arrangement 24, is at the value of 1. Curve $K_2$ represents, in relation to curve $K_1$, the transfer function of the respective active deflection mass arrangement which, generally speaking, can be referred to in principle as damper mass. It will be seen that at resonance 1 curve $K_2$ has a value diverging from 0 because, ultimately, to achieve the complete cancellation of vibrations that occurs ideally at resonance the deflection masses or deflection mass arrangement are or is fundamentally in an oscillating condition.

Curves $K_1$ and $K_2$ illustrate an embodiment example in which a comparatively heavy flywheel mass arrangement cooperates with a comparatively light deflection mass arrangement.

As has already been stated referring to FIG. 4, two spurious resonances develop in addition to the resonance at X-value 1, which is generally present with ideal tuning to an excitation order. When changing to a different operating mode, for example, an operating mode with a smaller number of operating cylinders, for example, half of the cylinders, the critical order shifts; when the quantity of cylinders is halved, a state occurs in which the ratio 0.5 on the X axis is critical. However, since this is equally far from the spurious resonances in curves $K_1$ and $K_2$, there is also practically no risk in this case of an excessive increase in vibrations due to a vibration system that is no longer correctly tuned to an order. In this state, a differently tuned vibration system or a different speed-adaptive damper can then take effect in order to achieve an efficient damping.

Curves $K_3$ and $K_4$ illustrate the transfer functions of the flywheel mass arrangement or deflection mass arrangement for the case where a comparatively light flywheel mass is combined with a comparatively heavy deflection mass arrangement or damper mass. With the same tuning to a determined exciting order, it will be noted that the spurious resonances which also occur in this case lie appreciably farther apart so that, in this case too, changing to an operating mode with a different performance capability, particularly a lower performance capability, in which the critical excitation order is, for example, the first order and no longer the second order, also does not have the result that a spurious resonance is encountered so that an excessive increase in vibration could take place.

Taking into account these transfer functions illustrated in FIG. 11, it is useful in accordance with a particularly advantageous aspect of the invention that a ratio between the mass moment of inertia of a respective acting deflection mass arrangement provided, for example, by the totality of deflection masses acting in association with an exciting order, to the mass moment of inertia of the flywheel mass arrangement, i.e., for example, the primary side 16 of the torsional vibration damper 12 shown in FIG. 5, is less than 90%, preferably less than 50%, which corresponds to curves $K_1$ and $K_2$ in FIG. 11, or is greater than 110%, preferably 200%, which is illustrated by curves $K_2$ and $K_4$ in FIG. 11. Accordingly, when changing between operating modes of different performance capability, the fact that different excitation orders in these different operating modes are variously critical can be prevented from leading to the result that a spurious resonance of a speed-adaptive damper is encountered in an operating mode which was previously uncritical but which becomes critical when a new operating mode is adopted. Alternatively or in addition, it can be provided that respective specially tuned deflection mass pendulum units, i.e., speed-adaptive dampers, are provided for different excitation orders which are to be assessed as differently critical in different operating modes.

It should be mentioned once again in this connection that this tuning to different excitation orders can be carried out by providing structurally separate units, or a plurality of deflection mass pendulum units of different configurations can be combined in order to find a tuning to different orders.

Based on the construction principle which was described with reference to FIG. 8, for example, FIG. 12 shows a fixed-frequency damper 60 with a plurality of deflection mass pendulum units 62, each having a deflection mass 64 and a restoring element 68 which is supported at a deflection mass carrier 66 and which carries the deflection mass 64. This restoring element 68, which is formed, for example, as a leaf spring pre-loads the deflection mass 64 in a basic relative position with respect to the deflection mass carrier 66 so that a spring-mass pendulum unit is formed in which it is possible to tune to a determined exciting frequency by means of the stiffness of the restoring element on the one hand and the selection of the mass of the respective deflection mass 64 on the other hand.

As is illustrated in FIG. 12, deflection mass pendulum units 62 of this kind can be configured differently in order to achieve tuning to different exciting frequencies. The identically configured deflection mass pendulum units 62 together with their respective deflection masses 64 form a deflection mass arrangement 65, which is effective for a respective frequency. A fixed-frequency damper 60 of this kind can be combined with the damping features described above for more extensive damping in order to achieve an additional damping particularly in rotational speed ranges in which a speed-adaptive damper can no longer be sufficiently effective owing to constructional aspects. When suitably tuned, a fixed-frequency damper 60 of this kind could also be tuned to different particularly critical frequencies also in association with different operating modes so as to ensure that expected particularly critical excitation frequencies can be efficiently damped in an adjusted operating mode. This means that the combination of a fixed-frequency damper 60 such as that illustrated in FIG. 12 with an internal combustion engine with variable operating modes can also provide by itself for an efficient absorption or damping of vibrations also when switching between different operating modes.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A drive system for a vehicle, comprising:
an internal combustion engine (5); and
a torsional vibration damping arrangement (10),
wherein the internal combustion engine (5) is switchable between operating modes of different performance capability, and
wherein the torsional vibration damping arrangement comprises:
a flywheel mass arrangement (16); and
at least one deflection mass pendulum unit (56; 56a; 62) with a deflection mass carrier (32; 32a; 66) and a deflection mass arrangement (44; 44a; 65) supported at the deflection mass carrier such that the deflection mass arrangement can deflect out of a basic relative position with respect to the deflection mass carrier by a deflection mass coupling arrangement (50; 54a);
wherein the at least one deflection mass pendulum unit (56) is formed as a centrifugal mass pendulum unit, wherein a radial distance of the deflection mass arrangement (44) relative to an axis of rotation changes when the deflection mass arrangement (44) is deflected from the basic relative position with respect to the deflection mass carrier (32)
at least one deflection mass pendulum unit (56a) comprises:
the deflection mass carrier (32a) rotatable around the axis of rotation (A);
a deflection mass (42a) which can be deflected in circumferential direction around the axis of rotation (A) with respect to the deflection mass carrier (32a);
a deformable restoring element (54a) which is or can be supported in a carrier support region with respect to the deflection mass carrier (32a) and in a deflection mass support region with respect to the deflection mass (42a), wherein a deflection of the deflection mass out of the basic relative position with respect to the deflection mass carrier (32a) in at least one direction causes a deformation of the deformable restoring element (54a); and
a supporting element (48a) radially movably supported at the deflection mass carrier (32a) and which provides the carrier support region, wherein a distance between the carrier support region and the deflection mass support region can be changed by movement of the supporting element (48a) at the deflection mass carrier (32a), and the supporting element is pre-loaded in direction of a radially inner basic position and, starting from the radially inner basic position, is displaceable radially outward in opposition to the pre-loading and to an action of centrifugal force when the deflection mass carrier (32a) rotates around the axis of rotation (A).

2. The drive system according to claim 1, wherein a mass moment of inertia of the deflection mass arrangement (44; 44a; 65) is either less than 90% of a mass moment of inertia of the flywheel mass arrangement (16) or is greater than 110% of the mass moment of inertia of the flywheel mass arrangement (16).

3. The drive system according to claim 1, wherein a mass moment of inertia of the deflection mass arrangement (44; 44a; 65) is either less than 75% of the mass moment of inertia of the flywheel mass arrangement (16) or is greater than 150%, of a mass moment of inertia of the flywheel mass arrangement (16).

4. The drive system according to claim 1, wherein a mass moment of inertia of the deflection mass arrangement (44; 44a; 65) is either less than 50% of a mass moment of inertia of the flywheel mass arrangement (16), or is greater than 200% of the mass moment of inertia of the flywheel mass arrangement (16).

5. The drive system according to claim 1, wherein at least two deflection mass pendulum units (56a, 56a') are differently configured in association with different excitation orders.

6. The drive system according to claim 5, wherein at least two deflection mass pendulum units (56a, 56a') are provided in association with at least one excitation order.

7. The drive system according to claim 1, wherein the operating modes include a first operating state in which all cylinders of the engine are in operation and at least a second operating state in which only some of the cylinders of the engine are in operation.

8. The drive system according to claim 1, wherein the operating modes include a two-cycle operation and a four-cycle operation.

9. The drive system according to claim 1, wherein at least one guide path (46, 48) with a vertex region is provided at the deflection mass carrier (32) and/or at the deflection mass arrangement (44), and the deflection mass coupling arrangement (50) comprises a coupling element (50) movable along the guide path (46, 48), wherein when the deflection mass arrangement (44) is deflected out of the basic relative position with respect to the deflection mass carrier (32a) the coupling element (50) moves starting from the vertex region of the guide path (46) provided in the deflection mass carrier (32) and/or of the guide path (48) provided in the deflection mass arrangement (44).

10. The drive system according to claim 1, wherein the at least one deflection mass pendulum unit (62) is formed as a spring-mass pendulum unit, wherein the deflection mass coupling arrangement comprises a spring arrangement (68) which is supported or can be supported with respect to the deflection mass carrier (66) and deflection mass arrangement (65).

11. The drive system according to claim 1, wherein there is further provided a torsional vibration damper (12) with a primary side (16) and a secondary side (22) rotatable around the axis of rotation (A) with respect to the primary side (16) against the action of a damper element arrangement (24), wherein the primary side (16) of the torsional vibration damper (10) preferably essentially provides the flywheel mass arrangement (16), and the secondary side (22) of the torsional vibration damper provides the deflection mass carrier (32).

12. The drive system according to claim 11, wherein the primary side (16) of the torsional vibration damper (12) essentially provides the flywheel mass arrangement (16), and the secondary side (22) of the torsional vibration damper provides the deflection mass carrier (32).

* * * * *